United States Patent
Gras et al.

[11] Patent Number: 5,859,164
[45] Date of Patent: Jan. 12, 1999

[54] URETDIONE-FUNCTIONAL POLYADDITION COMPOUNDS, A PROCESS FOR THEIR PREPARATION, AND THEIR USE

[75] Inventors: Rainer Gras, Bochum; Joern Volker Weiss, Haltern; Elmar Wolf, Recklinghausen; Felix Schmitt, Herten, all of Germany

[73] Assignee: Huels Aktiengesellschaft, Marl, Germany

[21] Appl. No.: 929,803

[22] Filed: Sep. 15, 1997

[30] Foreign Application Priority Data

Sep. 13, 1996 [DE] Germany ............ 196 37 377.8

[51] Int. Cl.$^6$ ............ C08G 18/10; C08G 18/12; C07D 229/00
[52] U.S. Cl. ............ 528/49; 524/86; 528/44; 528/62; 528/110; 540/202
[58] Field of Search ............ 524/86; 528/44, 528/49, 62, 73, 87, 110; 540/202

[56] References Cited

U.S. PATENT DOCUMENTS 3,998,794  12/1976  Müller et al. .............. 524/86

FOREIGN PATENT DOCUMENTS 0 045 998  2/1982  European Pat. Off. .

*Primary Examiner*—Yogendra N. Gupta
*Attorney, Agent, or Firm*—Oblon, Spivak, McClelland, Maier & Neustadt, P.C.

[57] ABSTRACT

Uretdione-functional polyaddition compounds of the formula:

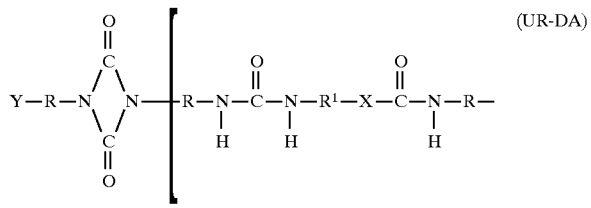

(UR-DA)

-continued

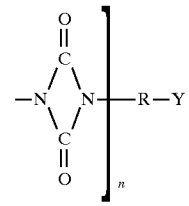

where:

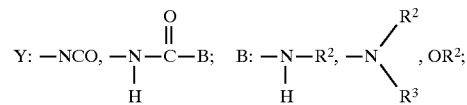

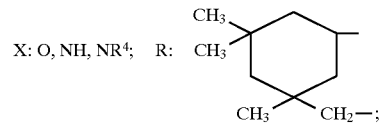

$R^1$ is R or linear, branched or cyclic alkylene radicals of 2–16 carbon atoms, $R^2$ and $R^3$ are identical or different hydrocarbon radicals of 1–14 carbon atoms, $R^4$ is $R^2$ or a group

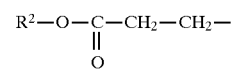

16 Claims, No Drawings

URETDIONE-FUNCTIONAL POLYADDITION COMPOUNDS, A PROCESS FOR THEIR PREPARATION, AND THEIR USE

BACKGROUND OF THE INVENTION

Field of the Invention

The present invention relates to polyaddition compounds which are uretdione-functional (i.e. contain uretdione groups) and have free, partially or fully blocked isocyanate groups, to a process for their preparation, and to the use of the polyaddition compounds in the preparation of polyurethane powder coatings having a matt surface.

DESCRIPTION OF THE BACKGROUND

For a considerable time there has been increasing interest in powder coatings which give a matt surface. The reason for this is predominantly of a practical nature. Glossy surfaces require a far higher measure of cleaning than do matt surfaces. In addition to this, it may be desirable for safety reasons to avoid highly reflecting surfaces.

The simplest way to obtain a matt surface is to employ a powder coating composition into which is mixed greater or smaller amounts of fillers such as chalk, finely divided silica or barium sulfate, depending on the extent of the desired matt effect. However, such additions cause a deterioration in the film performance properties such as adhesion, flexibility, impact strength and chemical resistance.

The addition of substances which are incompatible with the coating material, such as, for example, waxes or cellulose derivatives, does indeed lead to matting, however, slight changes during the course of extrusion cause fluctuations in the surface gloss. The reproducibility of the matt effect is not guaranteed. A need, therefore, continues to exist for polyurethane coating compositions which provide coatings of a matt finish of greater reproducibility.

SUMMARY OF THE INVENTION

Accordingly, one object of the present invention is to provide a PU powder coating composition which produces hardened coatings having a matt appearance, which are not hampered by the disadvantages mentioned above, and which matt appearance is substantially more reproducible.

Briefly, this object and other objects of the present invention as hereinafter will become more readily apparent can be attained by a compound of the formula:

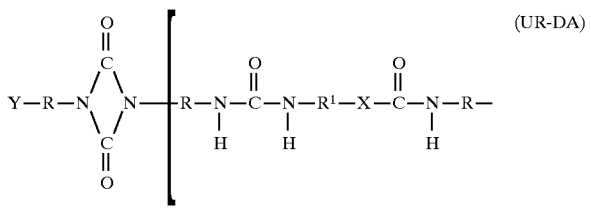
(UR-DA)

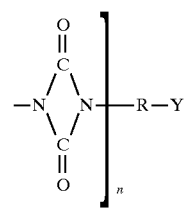

wherein:

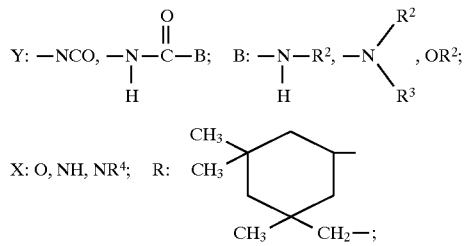

and wherein:

$R^1$ is R or linear, branched or cyclic alkylene radicals of 2–16 carbon atoms;

$R^2$ and $R^3$ are identical or different hydrocarbon radicals of 1–14 carbon atoms; and $R^4$ is $R^2$ or a group:

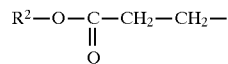

DETAILED DESCRIPTION OF THE PREFERRED EMBODIMENTS

The present uretdione-functional polyaddition has a free NCO group content of 0.1–5%, preferably 0.1–1%, an overall NCO content (free+latent NCO groups) of 10–18%, preferably 12–17%, a uretdione group content of 1.2–2.1 mmol/g, and a content of blocked NCO groups of 0–1 mmol/g. The melting point of the polyaddition compound varies within a range from 120°–180° C., preferably 140°–170° C. The polyaddition compound is outstandingly suitable for the preparation of PU powder coatings.

The polyaddition compound of the invention can be prepared by the following reaction:

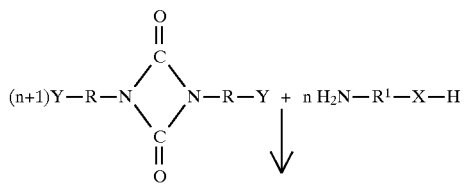

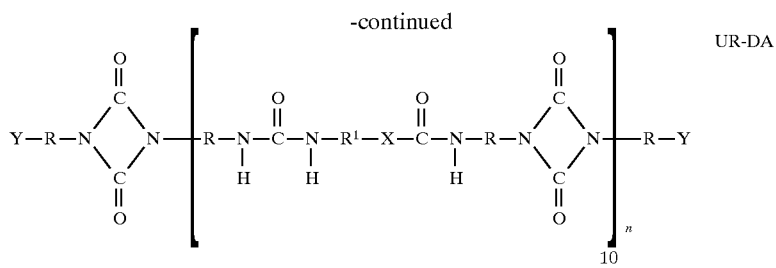

UR-DA wherein the free NCO groups of the UR-DA can, if desired, be reacted fully or partially with the blocking agent, and the substituents are as defined above.

The uretdione employed in the present process is the IPDI uretdione described in DE-A 30 30 513 and 37 39 549, which has a free NCO content of 17–18%; in other words, more or less high proportions of the polyuretdione of IPDI must be present in the reaction product. The monomer content is ≦1%. The overall NCO content of the IPDI uretdione after heating at 180°–200° C. (0.5 h) is 37.5–37.7%.

The diamines which are reacted with the uretdione polyaddition compound are diamines having a primary and a secondary amino group. These diamines are prepared in two stages, the 1st stage comprising the condensation of the diprimary diamine with an aldehyde or ketone, to form the Schiff base, and the 2nd stage comprising the hydrogenation and fractional distillation of the Schiff base. To minimize the amount of by-product (di-Schiff base) obtained it is necessary to employ a large excess of diamine- in general, 10 mol of diamine are reacted with one mole of carbonyl compound. Diamines suitable for the condensation to give the Schiff base include, in principle, all aliphatic and cycloaliphatic diamines, for example ethylenediamine, 1,2-diaminopropane, 2-methyl pentamethylenediamine, hexamethylenediamine, 2,2,4(2,4,4)-trimethylhexamethylenediamine, isophoronediamine, 1,2-diaminocyclohexane and 1,3-bis(aminomethyl)benzene. Suitable carbonyl compounds employed for the preparation of the Schiff base, include all (cyclo)aliphatic aldehydes and ketones. However, preferred aldehydes and ketones include isobutyraldehyde, 2-ethylhexanal, methyl isobutyl ketone, methyl ethyl ketone, diisobutyl ketone, cyclohexanone and 3,5,5-trimethylcyclohexanone.

One variant of the present process is to employ diamines obtained by reaction of diprimary diamines with acrylates, for example methyl, ethyl, butyl, t-butyl or 2-ethylhexyl acrylate. The reaction of the diamine with the acrylate takes place at 60°–80° C. in a molar ratio of 1:1.

Another advantageous variant of the present process is to employ hydrogenated cyanoethylated monoamines, for example N-methyl-1,3-propanediamine. Still another particularly advantageous variant of the process is to employ the hydrogenation product of acetonin (4-isopropylamino-2-amino-2-methylpentane) as reaction component for the IPDI uretdione.

The amino alcohols which are suitable in the present process include in principle all compounds containing a primary amino group and a primary or secondary OH group, examples being ethanolamine, 2-amino-1-butanol, 2-amino-2-methyl-1-propanol, monoisopropanolamine, 2-(2'-aminoethoxy)ethanol, 3-aminopropanol and 3-aminomethyl-3,5,5-trimethylcyclohexanol. In some cases it has been found advantageous to block the free NCO groups of the UR-DA in such a way that they are no longer exposed in the course of the stoving operation. The blocking agents are monoalcohols, for example methanol, ethanol, butanol or 2-ethylhexanol, or primary and secondary monoamines, for example butylamine, 2-ethylhexylamine, dibutylamine, di-2-ethylhexylamine and methylcyclohexylamine.

The novel, uretdione-functional polyaddition compounds can be prepared by the following process. The preparation takes place in two successive stages, where:

1. In the first stage, IPDI uretdione is reacted with the diamine containing a primary and secondary amino group and/or with the aminoalcohol, and
2. Then, in the second stage, if desired, the remaining free NCO groups are reacted with the blocking agent.

The reaction of stages 1 and 2 takes place in solution, the solvent being selected from the group consisting of aromatic hydrocarbons, esters and ketones, for example toluene, ethyl or butyl acetate, acetone, methyl ethyl ketone, methyl isobutyl ketone, or any desired mixtures of these solvents. A preferred solvent is acetone. The present compounds are prepared by metering the diamine into an acetone solution of the IPDI uretdione at room temperature at a rate such that the temperature of the reaction solution does not exceed 40° C. After the addition of diamine, the reaction is over. One alternative is then to remove the acetone by distillation, as is done if the reaction product is still to contain free NCO groups. If, however, the reaction product is no longer to contain free NCO groups, there follows the reaction with the blocking agent B-H. In the case of the monoamines, this can be done at room temperature, the reaction being at an end after the addition, in portions, of the monoamine. Where the blocking agents are monoalcohols, blocking is conducted at 60° C. and in the presence of 0.01% by weight of dibutyltin dilaurate (DBTL).

In the reaction of the IPDI uretdione with the amino alcohols, the aminoalcohol is metered in portions into the acetone IPDI uretdione solution at 60° C. After the addition of aminoalcohol, heating is continued at 60° C. until one NCO equivalent has reacted per OH equivalent. Blocking with monoalcohols and primary and secondary monoamines occurs in the same manner as occurs in the corresponding blocking of the IPDI uretdione/diamine adducts. If monoalcohols are employed as blocking agents, it has been found advantageous to react IPDI uretdione with the mono-alcohol at about 70° C. in the absence of solvent and, after the OH/NCO reaction has taken place, to carry out the reaction with the diamine and/or aminoalcohol in solution.

The present invention also provides for the use of the present compounds for preparing PU powders of a matt appearance. The polyurethane powder coating systems of the present invention consist of the present uretdione-functional polyaddition compounds in combination with hydroxyl-containing polymers.

Suitable polyol components for preparing the present matt PU powder coatings are in principle all OH-containing polymers, for example epoxy resins and hydroxy acrylate. Preferred, however, are hydroxyl-containing polyesters having an OH functionality of 3–6, a mean molecular weight of 1800–5000, preferably 2300–4500, an OH number of 25–140 mg of KOH/g, preferably 30–90 mg of KOH/g, and a melting point of ≧70 to ≦130° C., preferably >75 to ≦110° C. OH-containing polyesters of this kind, which are prepared in a known manner by condensation of polyols and polycarboxylic acids, are described in DE-A 27 35 497 and 30 04 903, for example.

To prepare the ready-to-use powder coatings, the OH-containing resin and the present uretdione-functional adducts are mixed, with or without pigments, for example TiO$_2$, and leveling agents, for example polybutyl acrylate, on extruders or compounders at temperatures between 90°–120° C. such that there are from 0.6 to 1.2, preferably 0.8–1.1, blocked NCO groups per OH group of the hydroxyl-containing resin.

The powder coatings thus produced can be applied by the customary powder application techniques, such as, for example, electrostatic powder spraying or fluidized bed sintering, to the shaped articles that are to be coated. The coatings are cured by heating at temperatures of 170°–200° C. Flexible coatings are obtained with outstanding anticorrosion properties and excellent thermal stability. In comparison with the PU powders known to date, based on blocked polyisocyanates, the novel PU powders are notable for producing a matt appearance, the degree of matt effect varying within a wide range.

In the text below the subject matter of the invention is illustrated with reference to examples.

Experimental section

A) Starting compounds for the hardener component

I. NCO component

The NCO component employed is an IPDI uretdione having an NCO content of 17.6% and an IPDI content of 1%. The NCO content of the IPDI uretdione after heating at 180° C. (1 h) is 37.5%.

II. Chain extenders (diamines, amino alcohols)

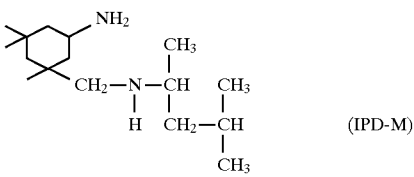

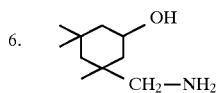

IPD-A 149 is prepared by an equimolar reaction of IPD and t-butyl acrylate and is, therefore, a mixture comprising about 70 mol-% of monoadduct and about 15 mol-% each of diadduct and free IPD.

III. Blocking agents

The free NCO groups of the present compounds are reacted as desired with 2-ethylhexanol or dibutylamine.

B) General preparation procedure for the novel compounds

The diamine is metered into the acetone solution of the IPDI uretdione at room temperature at a rate such that the temperature of the reaction solution does not exceed 40° C. After the addition of diamine, the reaction product is fully prepared. One alternative is then to remove the acetone by distillation, as is done if the reaction product is still to contain free NCO groups. If, however, the reaction product is no longer to contain free NCO groups, there follows the reaction with 2-ethylhexanol or dibutylamine. In the case of dibutylamine, this can be done at room temperature, the reaction product being fully formed upon completion of the addition, in portions, of the dibutylamine. Where 2-ethylhexanol is involved, the reaction is conducted at 60° C. and in the presence of 0.01% by weight of dibutyltin dilaurate.

In the reaction of the IPDI uretdione with the aminoalcohols, the metering of the amino alcohol in portions into the acetone IPDI uretdione solution takes place at 60° C. After the addition of aminoalcohol, heating is continued at 60° C. until one NCO equivalent is reacted per OH equivalent. Blocking with dibutylamine or 2-ethylhexanol occurs in the same manner as occurs in the corresponding blocking of the IPDI uretdione/diamine adducts.

The compounds listed in Table 1 below were prepared by the procedure employed in this invention.

C) Polyol component

The OH component of the present PU powders is the polyester ALFTALAT® AN 739 (Hoechst, Italy) having an OH number of 55–60 mg of KOH/g, an acid number of 2–4 mg of KOH/g, a melting point of 82°–90° C. and a viscosity at 160° C. of 24–29,000 mPa•s.

D) Preparation of powder coatings Preparation procedure

The ground products of IPDI uretdione/diamine adduct, polyester, leveling agent, and white pigment are intimately mixed in an edge runner mill and the mixture is then homogenized in an extruder at 80°–110° C. After cooling, the extrudate is fractionated and ground with a pin mill to a particle size <100 μm. The powder thus prepared is applied to degreased and optionally pretreated iron panels using an electrostatic powder spraying unit at 60 kV and is stoved in a circulating-air oven at 200° C. for between 15 and 30 minutes.

The hardener is mixed with the polyol in an NCO:OH ratio of 1:1. Substances added are:

| | |
|---|---|
| 40.0% by weight | of KRONOS 2160 |
| 1.0% by weight | of RESIFLOW PV 5 |
| 0.5 by weight | of benzoin |

The abbreviations in the table below have the following meanings:

LT=layer thickness in μm

EI=Erichsen indentation in mm (DIN 53 156)
GG 60° ⚹=Gardner gloss measurement (ASTM-D
Imp. rev.=Impact reverse in g·m

TABLE 1

Polyaddition Compounds

| Example No. | IPDI uretdione | diamine/ amino alcohol | $C_8H_{17}$—OH(a) | HN—$(C_4H_9)_2$(b) | % NCO free | % NCO overall | Melting range °C. |
|---|---|---|---|---|---|---|---|
| B. 1 | 5 | 4 A.II.1 | | | 2.2 | 15.4 | 157–160 |
| B. 2 | 5 | 4 A.II.1 | | 1.8 b | 0.3 | 12.6 | 150–159 |
| B. 3 | 10 | 9 A.II.1 | | 1.8 b | 0.2 | 12.2 | 163–171 |
| B. 4 | 10 | 9 A.II.1 | | | 1.0 | 13.8 | 160–169 |
| B. 5 | 10 | 9 A.II.1 | 2 a | | 0.6 | 13.1 | 151–161 |
| B. 6 | 15 | 14 A.II.1 | 2 a | | 0.2 | 13.0 | 154–162 |
| B. 7 | 10 | 9 A.II.2 | | | 1.2 | 15.9 | 150–155 |
| B. 8 | 10 | 9 A.II.3 | | | 1.1 | 13.0 | 156–160 |
| B. 9 | 10 | 9 A.II.4 | | | 1.2 | 15.8 | 150–154 |
| B. 10 | 10 | 9 A.II.5 | 2 a | | 0.1 | 16.9 | 143–150 |
| B. 11 | 5 | 4 A.II.6 | | | 1.9 | 16.7 | 159–163 |

TABLE 2

Pigmented powder coatings

| Example D composition | 1 | 2 | 3 | 4 | 5 | 6 | 7 | 8 |
|---|---|---|---|---|---|---|---|---|
| Crosslinker of B. | 1 | 4 | 5 | 6 | 2 | 3 | 8 | 9 |
| Polyester (Alftalat ® AN 739) | ←→ | | | | | | | |
| Notes: | The powder coatings consist of equivalent amounts of crosslinker and polyester; they also contain 40% by weight of white pigment (Kronos 2160), 1% by weight of Resiflow PV 5 and 0.5% by weight of benzion. | | | | | | | |
| Coating data | | | | | | | | |
| LT | 65–85 | 55–70 | 60–80 | 55–75 | 65–75 | 60–70 | | |
| GG 60° | 20 | 15 | 16 | 17 | 36 | 8 | 49 | 24 |
| EI | 1.0 | 2.7 | 1.8 | 0.6 | 1.5 | 6.8 | 9.1 | 9.8 |
| Imp. rev. | <10 | 20 | <10 | <10 | <10 | 20 | 40 | 80 |
| Notes: | Curing conditions: 180–220° C., 30–15 min | | | | | | | |

What is claimed as new and desired to be secured by Letters Patent of the United States is:

1. A uretdione-functional polyaddition compound of the formula:

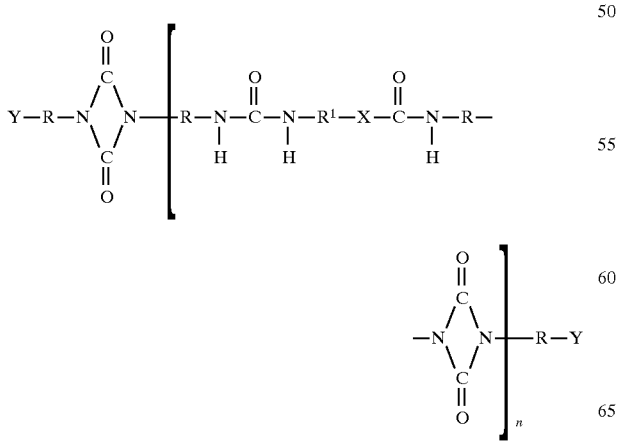

where:

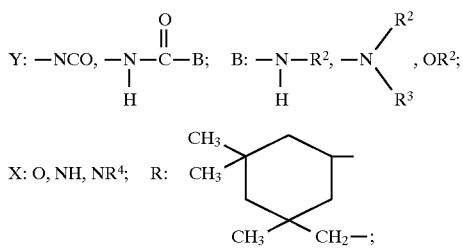

$R^1$ is R or linear, branched or cyclic alkylene radicals of 2–16 carbon atoms, $R^2$ and $R^3$ are identical or different hydrocarbon radicals of 1–14 carbon atoms, $R^1$ is $R^2$ or a group:

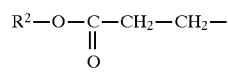

2. The polyaddition compound of claim 1, which has a free NCO group content of 0.1 to 5%, an overall NCO content of 10–18%, a uretdione group content of 1.2 to 2.1 mmol/g, and a blocked NCO group content of 0–1 mmol/g.

3. The polyaddition compound of claim 2, wherein the free NCO group content is 0.1–1% and the overall NCO group content is 12–17%.

4. The polyaddition compound of claim 1, which has a melting point ranging from 120°–180° C.

5. The polyaddition compound of claim 4, wherein said melting point ranges from 140°–170° C.

6. The polyaddition compound of claim 1, wherein the uretdione from which the polyaddition compound is prepared has a free NCO content of 17–18%.

7. A process for preparing a compound as claimed in claim 1, which comprises reacting isophorone diisocyanate uretdione in inert solvents with diamines, amino alcohols or diamines containing acrylate groups in accordance with the following reaction equation:

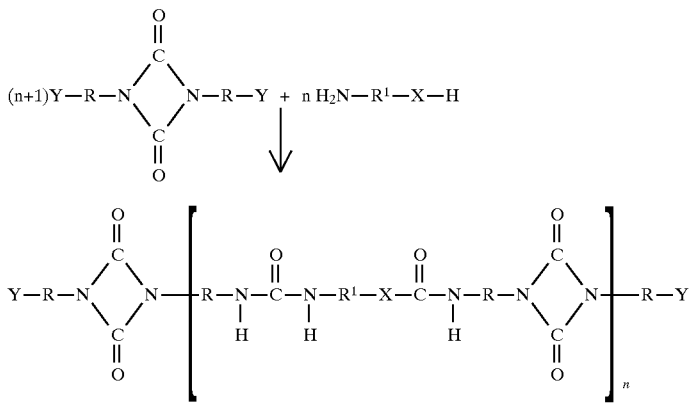

8. The process according to claim 7, wherein said uretdione is an IPDI uretdione having a free NCO content of 17–18%.

9. The process according to claim 7, wherein said diamine is the Schiff base reaction product of a diprimary diamine and an aldehyde or ketone.

10. The process according to claim 7, wherein said diprimary diamine is ethylenediamine, 1,2-diaminopropane, 2-methyl pentamethylenediamine, hexamethylenediamine, 2,2,4(2,4,4)-trimethylhexamethylenediamine, isophoronediamine, 1,2-diaminocyclohexane and 1,3-bis(aminomethyl)benzene.

11. The process according to claim 9, wherein said aldehyde or ketone is isobutyraldehyde, 2-ethylhexanal, methyl isobutyl ketone, methyl ethyl ketone, diisobutyl ketone, cyclohexanone and 3,5,5-trimethylcyclohexanone.

12. The process according to claim 7, wherein said aminoalcohol is ethanolamine, 2-amino-1-butanol, 2-amino-2'-methyl-1-propanol, monoisopropanolamine, 2-(2-aminoethoxy)ethanol, 3-aminopropanol and 3-aminomethyl-3,5,5-trimethylcyclohexanol.

13. The process according to claim 1, which further comprises blocking the free NCO group of said UR-DA with a monoalcohol, a primary monoamine or a secondary monoamine.

14. The process according to claim 7, wherein the reaction is conducted in a solvent selected from the group consisting of aromatic hydrocarbons, esters and ketones.

15. The process according to claim 7, which is conducted at a temperature not greater than 40° C. with the diamine reactant.

16. The process according to claim 7, which is conducted at a temperature not greater than 60° C. with the aminoalcohol reactannt.

* * * * *